United States Patent [19]
Heismann et al.

[11] Patent Number: 5,611,005
[45] Date of Patent: Mar. 11, 1997

[54] HIGH-SPEED POLARIZATION SCRAMBLER WITH ADJUSTABLE CHIRP

[75] Inventors: Fred L. Heismann, Tinton Falls, N.J.; Robert W. Smith, Allentown, Pa.

[73] Assignee: Lucent Technologies, Inc., Murray Hill, N.J.

[21] Appl. No.: 638,423

[22] Filed: Apr. 26, 1996

[51] Int. Cl.⁶ .................. G02B 6/00; G01B 9/02
[52] U.S. Cl. .................. 385/11; 385/1; 385/2; 385/3; 385/14; 385/39; 385/40; 385/49; 356/345; 356/351
[58] Field of Search .................. 385/11, 1, 2, 3, 385/14, 15, 31, 36, 39, 40, 49, 130, 131, 132; 350/345, 351

[56] References Cited

U.S. PATENT DOCUMENTS

| | | | |
|---|---|---|---|
| 4,711,515 | 12/1987 | Alferness | 385/11 X |
| 4,832,431 | 5/1989 | Nolting et al. | 385/3 X |
| 4,898,441 | 2/1990 | Shimizu | 385/11 X |
| 4,923,290 | 5/1990 | Brinkmeyer et al. | 385/11 X |
| 5,101,450 | 3/1992 | Olshansky | 385/3 |
| 5,111,517 | 5/1992 | Riviere | 385/11 |
| 5,159,481 | 10/1992 | Maeda | 385/11 X |
| 5,359,678 | 10/1994 | Heismann et al. | 385/1 |
| 5,408,544 | 4/1995 | Seino | 385/3 |
| 5,440,414 | 8/1995 | Kersey et al. | 385/11 X |
| 5,446,533 | 8/1995 | Udd et al. | 356/73.1 |
| 5,471,545 | 11/1995 | Negami et al. | 385/1 |
| 5,497,437 | 3/1996 | Hikami et al. | 385/11 |

OTHER PUBLICATIONS

Heismann, F. et al. "Electrooptic Polarization Scramblers for Optically Amplified Long–Haul Transmission Systems", IEEE Photonics Technology Letters, vol. 6, No. 9, Sep. 1994 pp. 1156–1158.

*Primary Examiner*—Brian Healy

[57] ABSTRACT

Two separate electrooptic phase modulators are used in a modified Mach-Zehnder interferometer to vary the absolute and relative optical phases of two orthogonally polarized modes of an input signal independently of each other. A conventional Y-branch splitter on lithium niobate splits the input signal equally into the two waveguide phase modulators and an external polarization splitter recombines the two phase modulated signals in orthogonal polarization states. The polarization in the interferometer is maintained by connecting the outputs of the two phase modulators to polarization maintaining fibers. An alternate embodiment of the present invention uses an additional 3-dB directional coupler to mix the two phase modulated signals before they are combined in orthogonal polarization states.

18 Claims, 3 Drawing Sheets

HIGH-SPEED POLARIZATION SCRAMBLER WITH ADJUSTABLE CHIRP

FIELD OF THE INVENTION

The invention relates to fiber optic transmission systems, and even more particularly to electro-optic phase and polarization scramblers.

BACKGROUND OF THE INVENTION

Very long optical fiber transmission paths, such as those employed in undersea or transcontinental terrestrial light wave transmission systems, employ optical repeaters along the path. As such, such fiber paths are subject to a host of impairments that accumulate along the length of the optical fiber composing the transmission path, thus causing the system performance to degrade.

Experimental evidence has shown that polarization dependent effects, induced by the optical fiber itself and/or other optical components (e.g., repeaters, amplifiers, etc.) along the transmission path, contribute to signal fading and signal-to-noise-ratio (SNR) fluctuations. One of the polarization dependent effects is termed polarization hole burning (PHB), which is related to the population inversion dynamics of optical amplifiers. PHB reduces the gain of optical amplifiers within a transoceanic transmission system for any signal having a state of polarization ("SOP") parallel to that of the primary optical signal carried by the transmission system, whereas the gain provided by these amplifiers for optical signals having an SOP orthogonal to that of the primary signal remains relatively unaffected. In simplified terms, the primary optical signal produces an anisotropic saturation of the amplifier that is dependent upon the SOP of the primary optical signal. The anisotropic saturation reduces the population inversion within the amplifier, and results in a lower gain for optical signals having the same SOP as the primary signal. This effectively causes the amplifier to preferentially enhance noise having an SOP orthogonal to that of the primary signal. This enhanced noise lowers the SNR of the transmission system and causes an increased bit error rate ("BER").

One method of eliminating anisotropic gain saturation (i.e. polarization hole burning) in erbium-doped fiber amplifiers in optically amplified lightwave systems is to use high-speed polarization scramblers which depolarize the launched optical information signal. An example of such a prior art polarization scrambler is described in Heismann et al, "Electrooptic Polarization Scramblers for Optically-Amplified Long-Haul Transmission Systems,"IEEE Photon. Technology Letters 6, p. 1156 (1994).

Other methods to improve the transmission of optical information signals along such optically-amplified paths include the use of additional bit-synchronous phase modulation at the clock frequency of the optical information signal. This type of phase modulation improves the performance of the non-return-to-zero (NRZ) systems through partial, nonlinear conversion of the phase modulation into amplitude modulation. Typically, a single waveguide polarization scrambler generates a combination of polarization and phase modulation if the input light is linearly polarized at 45°. Examples of polarization scramblers based on this type of modulation are described in U.S. Pat. No. 5,359,678, entitled "Apparatus and Method Employing Fast Polarization Modulation To Reduce Effects of Polarization Hole Burning and/or Polarization Dependent Loss," issued to Heismann et al on Oct. 25, 1994 and U.S. patent application Ser. No. 08/312,848, now U.S. Pat. No. 5,526,162, entitled "Synchronous Polarization and Phase Modulation for Improved Performance of Optical Transmission Systems," filed Sep. 27, 1994 by Bergano, both of which are incorporated herein by reference.

Generally, conventional polarization scramblers function by applying a voltage, V(t), to the drive electrode of the modulator which induces different optical phase shifts for the TE- and TM-polarized modes via the $r_{13}$ and $r_{33}$ electro-optic coefficients, respectively. The induced phase shift for the TM-polarized mode, $\Phi_{TM}(t)$, is given by:

$$\Phi_{TM}(t)=\Gamma(r_{33}/\lambda_o)V(t),$$

where $\Gamma$ is a constant, $\lambda_o$ is the optical wavelength in free space, and $r_{33} \approx 30.8 \times 10^{-12}$ m/V. Similarly, the induced phase shift for the TE-polarized mode, $\Phi_{TE}(t)$, is given by: $\Phi_{TE}(t) = \Gamma(r_{13}/\lambda_o)V(t)$, where and $r_{13} \approx 8.6 \times 10^{-12}$ m/V. As represented by these equations, the two phases in these conventional phase modulators are shifted in the same direction but at substantially different rates ($r_{33} \approx 3.6 r_{13}$). This gives rise to a differential TE-TM phase retardation, $\Phi(t)$, with $\Phi(t) = \Phi_{TM}(t) - \Phi_{TE}(t) = (\Gamma/\lambda_o)(r_{33}-r_{13})V(t)$ and to a common phase modulation, $\exp(j\Psi(t))$, with $\Psi(t)=(\Phi_{TM}(t)+\Phi_{TE}(t))/2=(\Gamma/2\lambda_o)(r_{33}+r_{13})V(t)$. Hence, the relative amounts of phase and polarization modulation in prior art devices are dependent upon each other by the ratio $(r_{33}+r_{13})/(2(r_{33}-r_{13}))$.

Therefore, there exists a need in this art to provide a high-speed polarization scrambler which can adjust the phase and polarization modulation independently. In particular, there exists a need for a polarization scrambler which can produce a pure (chirp free) polarization modulation as well as a pure phase modulation. The present invention addresses these needs.

SUMMARY OF THE INVENTION

Accordingly, the present invention provides a high-speed polarization scrambler which can independently adjust the phase and polarization modulation to produce any desired combination of chirp free polarization modulation and pure phase modulation. This is accomplished by varying the optical phases of two orthogonally polarized modes independently of each other by using two separate phase modulators. In using two phase modulators, the present invention is based on the principles of a Mach-Zehnder type interferometer using a conventional Y-branch splitter to split the input signal equally and a (bulk-optic) polarization splitter/ combiner (PBS) to recombine the output. The polarization of the output of the two phase modulators is maintained by connecting the output of the two arms of the interferometer (i.e. the two phase modulators) to polarization maintaining fibers (PMF). Preferably, the Y-branch splitter and the two high-speed phase modulators are integrated on a z-cut lithium niobate substrate using standard single mode waveguides. In an alternate embodiment, the present invention uses an additional 3-dB directional coupler on the lithium niobate substrate located after the two phase modulators.

In operation, the light signal input into the lithium niobate modulator of the present invention is TM-polarized and is equally divided between two parallel waveguide phase modulators which independently modulate the optical phases of the TM-polarized light (i.e. in the two different arms of the interferometer). The two phase modulators are driven by sinusoidal voltages of the form $V_1\cos(\Omega t+\Phi)$ and $V_2\cos(\Omega t)$ such that the phase retardations, $\Phi_1(t)$ and $\Phi_2(t)$ caused by these different drive voltages are equal to $\Delta\Phi_1\cos(\Omega t+\phi)$ and $\Delta\Phi_2\cos(\Omega t)$. By driving the two independent phase modulators in this manner and combining the two phase modulated signals in orthogonal polarization states, the interferometer acts as a polarization scrambler capable of generating any combination of differential phase retardation and common phase modulation between and on these two orthogonal polarization states simply by adjusting the relative drive phase and the peak phase deviations via the drive voltage amplitudes $V_1$ and $V_2$ applied to the two phase modulators.

BRIEF DESCRIPTION OF THE DRAWINGS

These and other features of the present invention will be better understood in light of the following Detailed Description of the Invention and the attached drawings wherein.

For purposes of the ensuing Detailed Description of the Invention, like reference numerals will refer to like elements of the invention.

DETAILED DESCRIPTION OF THE INVENTION

Figure 1:
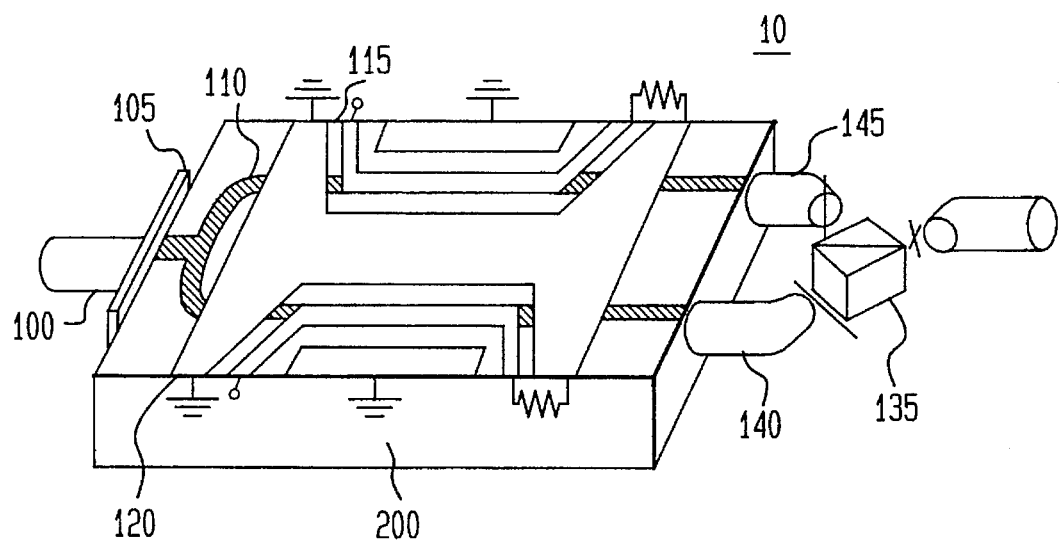
FIG. 1 is a perspective view of one embodiment of the present invention.

Referring now to FIG. 1, there is shown a perspective view of one embodiment of the present invention. As shown, the light signal is input into the high-speed polarization scrambler 10 via a fiber optic means 100. The signal is fed through a polarizer 105 which is coupled to a beam splitter 110. The beam splitter, via two diffused waveguides (preferably standard titanium-diffused waveguides), feeds into two phase modulators 115 and 120. The two phase modulators 115 and 120 are driven by two independent voltages to modulate the phase and polarization which will be discussed later. Those skilled in the art will recognize that with this configuration, the present invention is based on a Mach-Zehnder type interferometer. At the output of each phase modulator 115 and 120 (the output of the two arms of the interferometer), polarization maintaining fibers (PMFs) 140 and 145 input the modulated signal into a bulk optic or fiberoptic polarization splitter/combiner 135. Preferably, the splitter 110 and the two high-speed phase modulators are integrated on a z-cut lithium niobate (LiNbO$_3$) substrate 200 using standard single-mode waveguides. The additional circuitry of the phase modulators is shown using conventional symbols.

In operation, the light input into the lithium niobate modulator is TM-polarized by polarizer 105 and is equally divided between two parallel waveguide phase modulators 115 and 120 via beam splitter 110. The two phase modulators independently modulate the optical phases of the TM-polarized light in the two arms $\Phi_1(t)$ and $\Phi_2(t)$ via the r33 electro-optic coefficients similar to the equation:

$$\Phi_{TM}(t)=\Gamma(r_{33}/\lambda_o)V(t),$$

given above

For the present invention shown in FIG. 1, the two phase modulated waves are combined in orthogonal polarization states by converting one of the signals into TE-polarized light before it enters the polarization splitter/combiner 135 (PBS). The normalized amplitudes of the TE- and TM- polarized components after the PBS, $A_{TM}$ and $A_{TE}$, are described by the Jones vector:

$$\begin{pmatrix} A_{TM} \\ A_{TE} \end{pmatrix} = \frac{1}{\sqrt{2}} \begin{pmatrix} \exp(\Phi_1(t)) \\ \exp(\Phi_2(t)) \end{pmatrix},$$

where it is assumed that there are identical optical path lengths in the two arms (two phase modulators 115 and 120). From this, the differential TE-TM phase retardation is then given by $\Phi(t)=\Phi_1(t)-\Phi_2(t)$ and the common phase shift by $\Psi(t)=(\Phi_1(t)+\Phi_2(t))/2$.

In operation, then the phase modulators 115 and 120 are driven by sinusoidal voltages of the form $V_1\cos(\Omega t+\phi)$ and $V_2\cos(\Omega t)$, wherein $\Omega/2\pi$ is the modulated frequency and $\phi$ is an adjustable electric phase such that the phase retardations, $\Phi_1(t)$ and $\Phi_2(t)$, caused by these different drive voltages are equal to $\Delta\Phi_1\cos(\Omega t+\phi)$ and $\Delta\Phi_2\cos(\Omega t)$. It follows from the Jones vector equations given above that by driving the two independent phase modulators at these respective sinusoidal voltages, the polarization scrambler 10 is capable of generating any desired combination of a differential phase retardation, $\Phi(t)$, and a common phase modulation, $\Psi(t)$, simply by adjusting the relative drive phase, $\phi$, and the peak phase deviations, $\Delta\Phi_1$ and $\Delta\Phi_2$, via the drive voltage amplitudes $V_1$ and $V_2$ applied to the phase modulators 115 and 120.

For example, if the two phase modulators are driven with equal voltage amplitudes, $V_1=V_2$, such that $\Delta\Phi_1=\Delta\Phi_2$, the following is obtained: $\Phi(t)=-\Delta\Phi\sin(\Omega t+\phi/2)$, $\Psi(t)=-\Delta\Psi\cos(\Omega t+\phi/2)$ with $\Delta\Phi=2\Delta\Phi_1\sin(\phi/2)$ and $\Delta\Psi=\Delta\Phi_1\cos(\phi/2)$, such that $(\Delta\Phi/2)^2+(\Delta\Psi)^2=(\Delta\Phi_1)^2$. Note that $\Phi$ and $\Psi$ are modulated in quadrature phase. The relative amounts of phase and polarization modulation are determined by the drive phase, $\phi$, wherein at $\phi=\pi$, a chirp free polarization modulation is obtained and at $\phi=0$, a pure phase modulation is obtained. Similarly, for fixed drive phase $\phi=\pi$ and variable peak phase deviations $\Delta\Phi_1$ and $\Delta\Phi_2$, it is found that:

$$\Phi(t)=(\Delta\Phi_1+\Delta\Phi_2)\cos(\Omega t+\pi),$$

$$\Psi(t)=(\Delta\Phi_1-\Delta\Phi_2)/2\cos(\Omega t)$$

where $\Phi$ and $\Psi$ are modulated in phase (or in anti-phase).

Figure 2:
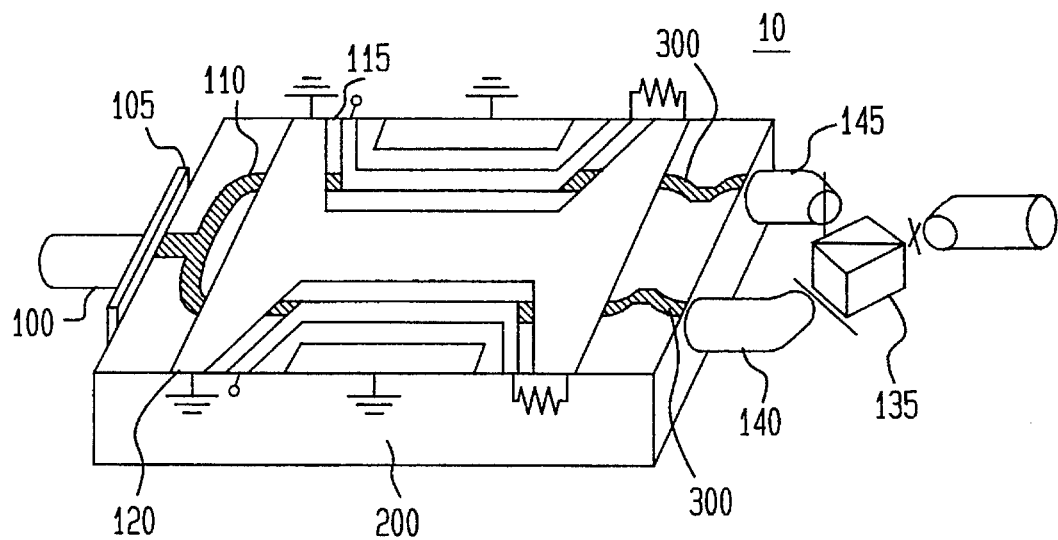
FIG. 2 is a perspective view of another embodiment of the present invention.

Now referring to FIG. 2, there is shown another embodiment of the present invention. As shown, this second embodiment is similar to the embodiment shown in FIG. 1 except that this second embodiment includes the use of a 3-dB directional coupler 300. The two phase modulated signals are mixed in the 3-dB directional coupler 300 before the modulated signals are combined in orthogonal polarization states. The 3-dB coupler 300 converts the differential phase retardation, $\Phi(t)$, into amplitude modulation while leaving the common phase modulation, $\Psi(t)$, essentially unchanged. The output powers of the 3-dB coupler, therefore, are proportional to $\cos^2(\Phi(t)/2+\pi/4)$ and $\sin^2(\Phi(t)/2+\pi/4)$. Thus, the amplitudes of the TE- and TM-polarized signals after the PBS are given by:

$$\begin{pmatrix} A_{TM} \\ A_{TE} \end{pmatrix} = \begin{pmatrix} \cos(\Phi(t)/2 + \pi/4) \\ \sin(\Phi(t)/2 + \pi/4) \end{pmatrix} \times \exp(j(\Psi(t) - \pi/4)).$$

As those skilled in the art will recognize, the operation of the scrambler shown in FIG. 2 is similar to that of a pure phase modulator followed by a variable polarization rotator.

Thus, by driving the two phase modulators 115 and 120 with sinusoidal voltages of the form $V_1\cos(\Omega t+\phi)$ and $V_2\cos(\Omega t)$, as in the case of the scrambler in FIG. 1, the scrambler is capable of generating any desired combination of a differential phase retardation, $\phi(t)$, and a common phase modulation, $\Psi(t)$, and in particular, a pure polarization modulation as well as a pure phase modulation.

Figure 3:
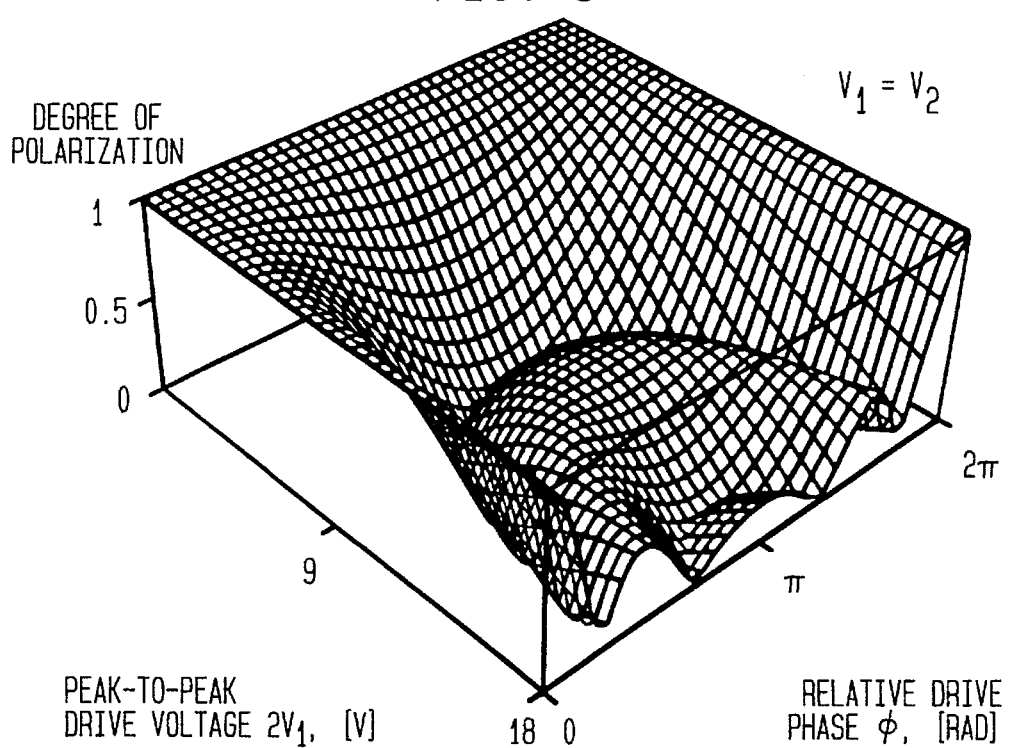
FIGS. 3 and 4 are three dimensional graphs of the degree of polarization in the output light of the present invention versus drive voltage amplitudes and phases: wherein in FIG. 3 $V_1=V_2$; and for FIG. 4 $\phi=\pi$; and wherein the modulation frequency is 10 kHz.
Figure 4:
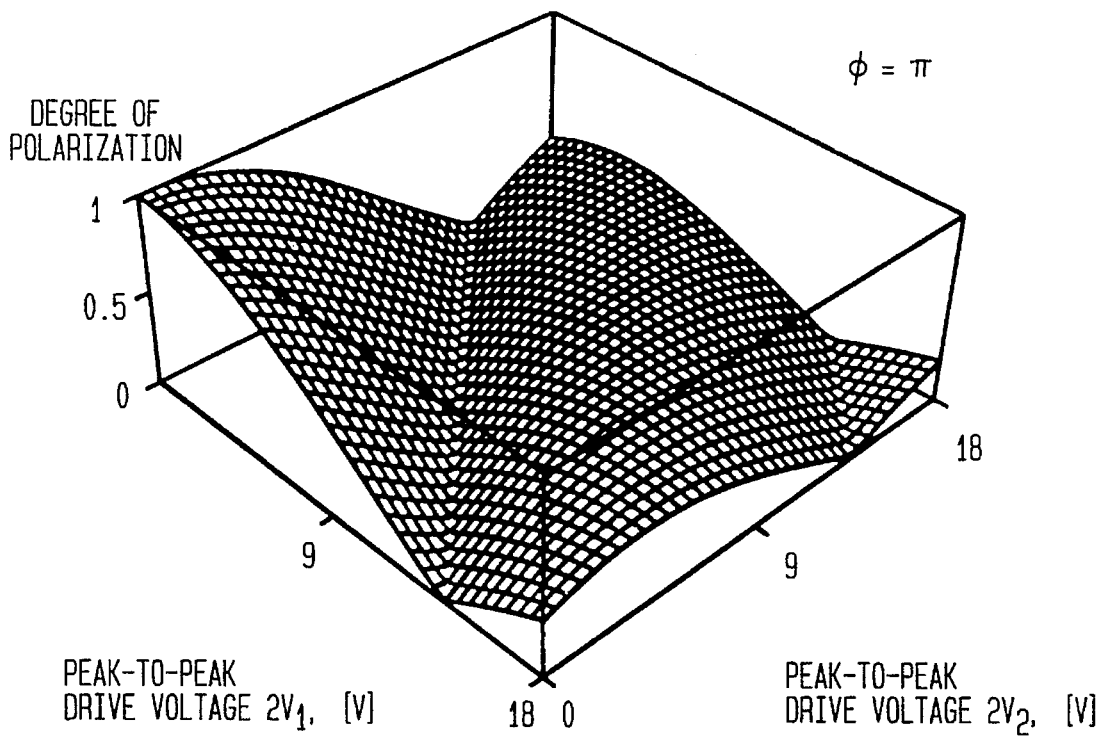

FIGS. 3 and 4 show the results of the degree of polarization in the output light versus drive voltage amplitudes and phases for the device shown in FIG. 2. In the particular device tested, two high-speed phase modulators having identical 2-cm long traveling wave electrodes were used. The lithium niobate modulator tested also had a fiber-to-fiber insertion loss of 3.5 dB and a 3-dB modulation bandwidth of 14 GHz when operated as an intensity modulator. The overall fiber-to-fiber insertion loss of the entire scrambler was less than 5 dB (including fiber connectors). It should be noted that the optical powers in the two arms of the lithium niobate modulator and the two PMF connections to the PBS must be well balanced in order to avoid undesired intensity modulation in the output light. Furthermore, the optical path lengths of the two interferometer arms need to be well matched to avoid polarization mode dispersion (PMD). The device of FIG. 2 exhibited about 5 ps of PMD and 2% residual intensity modulation. The coupling ratio in the 3-dB coupler of the MZI modulator, however, is less critical for the present invention.

FIG. 3 displays the degree of polarization in the output light of the scrambler, measured with an Hewlett-Packard 8509B polarization analyzer, versus the drive phase $\phi$ and drive voltage amplitudes $V_1=V_2$. The scrambler of the present invention was operated at a wavelength of 1558 nm and modulated at a frequency of 10 kHz. As shown, the first minimum in the degree of polarization occurs at $V_1=V_2=3.45V$ and $\phi=\pi$. At this operating point, the scrambler generated a chirp-free polarization modulation with $\Delta\Phi=2.40$ rad and $\Delta\Psi=0$ rad.

At $V_1=3.45V$ and $\phi=0$, the scrambler produced a pure phase modulation with $\Delta\Psi=1.20$ rad. At voltage amplitudes above 3.45 V, at least two values of $\phi$ were found with a minimum degree of polarization and the depolarized output light was, in general, phase modulated. A second chirp-free degree of polarization minimum occurred at $V_1=7.9V$ and $\phi=\pi$, with $\Delta\Phi=5.52$ rad. At the same voltage amplitude and $\phi=0.90$, another minimum in the degree of polarization with large superimposed phase modulation, i.e. $\Delta\Psi=2.48$ rad and $\Delta\Phi=2.40$ rad, was found.

Figure 5:
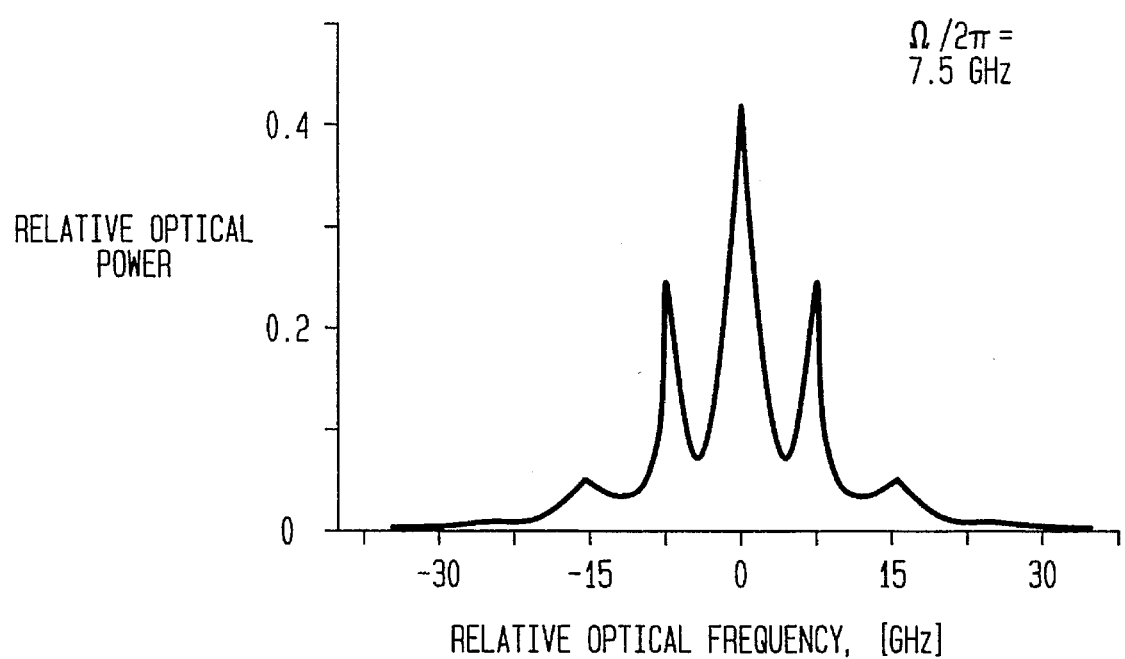
FIG. 5 is the optical output spectrum at the first degree of polarization minimum with $V_1=V_2$ and $\phi=\rho$, wherein the scrambler of the present invention was modulated at 7.5 GHz.

FIG. 4 shows the output degree of polarization versus $V_1$ and $V_2$ for a fixed drive phase $\phi=\pi$. For each voltage amplitude $V_1$ at least one value of $V_2$ with a minimal degree of polarization (and vice versa) was found. Chirp-free polarization modulation, however, was only obtained for $V_1=V_2$. FIG. 5 shows the optical output spectrum for chirp-free polarization modulation at the first minimum of the degree of polarization with $\phi=\pi$. The scrambler of the present invention was modulated for this graph at a frequency of 7.5 GHz and with a total drive power of 560 mW. From FIG. 5 it may be deduced that the scrambler generated chirp-free polarization modulation with $\Delta\Phi\approx2.4$ rad and $\Delta\Psi\approx0$ rad. It should be noted that the sideband amplitudes in the output spectrum are independent of the drive phase $\phi$. If the drive phase is detuned from $\pi$, such that $\Delta\Phi<2.4$ rad and $\Delta\Psi>0$ rad, the same spectrum as in FIG. 4 can be obtained. This result can be understood by transforming the Jones vector for the device of FIG. 2 into the components of linearly polarized light at $+45°$ and $-45°$, which yields:

$$\begin{pmatrix} A_{+45} \\ A_{-45} \end{pmatrix} = \frac{1}{\sqrt{2}} \begin{pmatrix} \exp(j\Delta\Phi_1\cos(\Omega t + \phi)) \\ \exp(j\Delta\Phi_2\cos(\Omega t)) \end{pmatrix},$$

which is similar to the Jones vector of the scrambler of FIG. 1.

The power spectra of these two orthogonally polarized components, either separately or in combination, are always identical and independent of $\phi$. They are also insensitive to DC offsets in the drive voltages. The sideband amplitudes in both spectra, however, change with drive power in the same fashion as for pure phase modulation.

Therefore, although the present invention has been described with respect to its application to two embodiments, those skilled in the art would be able to apply the present invention to any number of other high-speed polarization scramblers, such as, but not limited to, polarization modulators in III-V semiconductor materials and other electrooptic materials. It is also obvious to those skilled in the arts that the polarization splitter/combiner together with a polarization rotator could be integrated with the Y-branch splitter and the phase modulators on the same substrate. Accordingly, the breadth of the present invention should not be limited to the embodiments described above but only by the appended claims.

What is claimed is:

1. A high-speed polarization scrambler for modulating the phase and the state of polarization of a polarization signal, comprising:

input signal means;

an optical splitter means to split the input signal into at least a first and a second input signal branches;

at least a first and a second optic phase modulators connected to the first and second input signal branches, respectively; and an optical polarization combiner connected to an output of the first and second phase modulators, wherein the combiner combines said outputs of the first and second phase modulators in two mutually orthogonal polarization states;

wherein the first and second phase modulators independently modulate the optical phases of the input signals in said first and second input signal branches.

2. The polarization scrambler of claim 1 wherein said first and second phase modulators are driven by sinusoidal signals of the form $V_1\cos(\Omega t+\phi)$ for said first phase modulator and $V_2\cos(\Omega t)$ for said second phase modulator, where $V_1$ is the drive amplitude of the first phase modulator, $\phi$ is the drive phase, and $V_2$ is the drive amplitude of the second phase modulator, such that the phase retardation in said first and second input signal branches, caused by the first and second drive signals, are equal to $\Delta\Phi_1\cos(\Omega t+\phi)$ and $\Delta\Phi_2\cos(\Omega t)$.

3. The polarization scrambler of claim 2 wherein the common phase modulation and the differential polarization modulation of the combined optical signals at the output of the scrambler are independently adjustable by the amplitudes of the first and second drive signals and the relative drive phase of the first and second phase shifter.

4. The polarization scrambler of claim 1 wherein the optical splitter and the first and second phase modulators are optical waveguide devices integrated onto a z-cut lithium niobate substrate, and wherein said input signal input into the first and second phase modulators being TM-polarized by a polarizer means and divided by the optic splitter between the first and second phase modulators.

5. The polarization scrambler of claim 4 further comprising a first and second polarization maintaining fibers connected to the outputs of the first and second phase modulators, respectively.

6. The polarization scrambler of claim 1 further comprising a 3-dB directional coupler connected to the outputs of said first and second phase modulators and to the inputs of said polarization combiner.

7. The polarization scrambler of claim 4 wherein the input signal is equally split by a Y-branch splitter and the first and second phase modulators are identical.

8. The polarization scrambler of claim 4 wherein the polarization combiner is a bulk-optic polarization combiner.

9. The polarization scrambler of claim 4 wherein the polarization combiner is a fiberoptic polarization combiner.

10. A method of scrambling a polarized optical input signal at high speeds comprising the steps of:
splitting the optical input signal into at least two optical signals;
inputting the split optical signals into at least a first and second independent phase modulators;
independently varying the optical phases of the two optical signals by the first and second phase modulators; and
recombining the two optical signals in two mutually orthogonal polarization states.

11. The method of claim 10 wherein the first and second phase modulators are driven by two different sinusoidal signals of the form $V_1\cos(\Omega t+\phi)$ for the first phase modulator and $V_2\cos(\Omega t)$ for the second phase modulator, where $V_1$ is the drive amplitude of the first phase modulator, $\phi$ is the drive phase, and $V_2$ is the drive amplitude of the second phase modulator, such that the phase retardations for the first and second phase shifters caused by the first and second drive voltages are equal to $\Delta\Phi_1\cos(\Omega t+\phi)$ and $\Delta\Phi_2\cos(\Omega t)$.

12. The method of claim 11 wherein the common phase modulation and the differential polarization modulation of the combined optical signals at the output of the scrambler are independently adjustable by the amplitudes and the relative phase of the drive signals of the first and second phase shifter.

13. The method of claim 10 wherein the optical splitter and splitter and the first and second phase modulators are waveguide devices integrated onto a z-cut lithium niobate substrate.

14. The method of claim 13 further comprising the step of maintaining the polarization of the outputs of the first and second phase modulators by first and second polarization maintaining fibers connected to the outputs of the first and second phase modulators, respectively.

15. The method of claim 10 further comprising the step of mixing the two phase modulated optical signals in a 3-dB directional coupler which is connected at the outputs of the first and second phase modulators, before they are combined in orthogonal polarization states.

16. The method of claim 13 wherein the input signal is equally split by a Y-branch splitter, and wherein the first and second phase modulators are identical.

17. The method of claim 12 wherein the two phase modulated signals are combined in a bulk-optic polarization combiner.

18. The method of claim 12 wherein the two phase modulated signals are combined in a fiberoptic polarization combiner.

* * * * *